Figure 1:
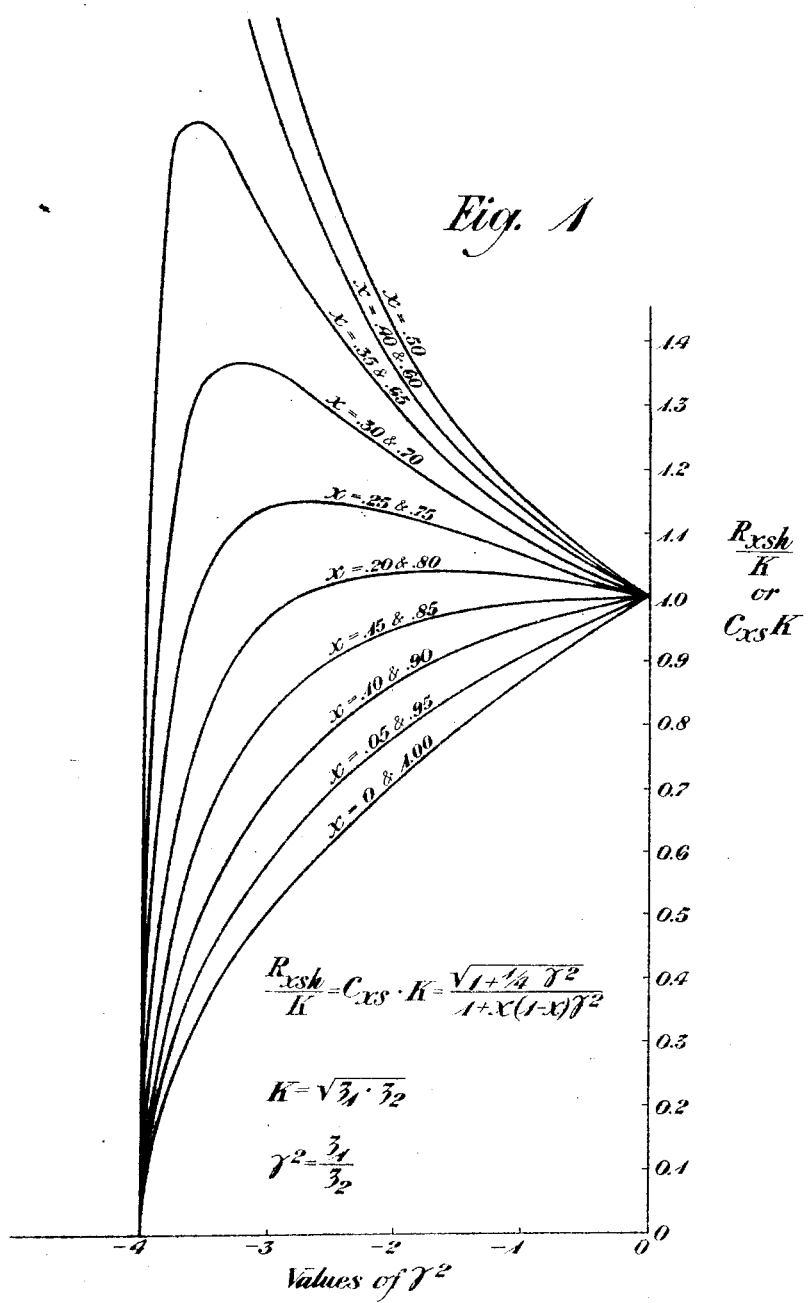

Oct. 13, 1925.
O. J. ZOBEL
COMPLEMENTARY FILTER
Filed April 30, 1920      3 Sheets-Sheet 3
*Wave-Filters Designed With Inductances and Capacities*
$$\sqrt{z_1 \cdot z_2} = \sqrt{z_1' \cdot z_2'} = k = \text{Constant}$$
$$z_1' = a \cdot z_2 \; ; \; z_2' = a \cdot z_1$$
$$x = .25 + .5\sqrt{.25 + \tfrac{4}{a}}$$
*When Transmission Regions Touch, $a = 4$ and $x = .809$*
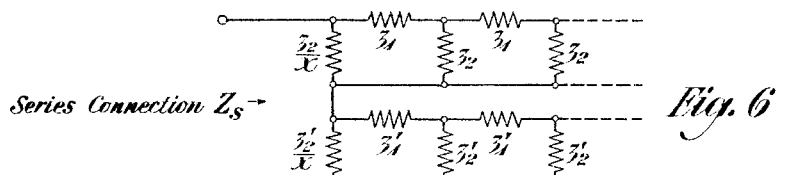
Fig. 6 — Series Connection $Z_S$
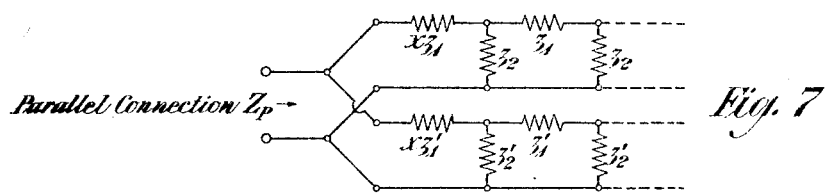
Fig. 7 — Parallel Connection $Z_P$
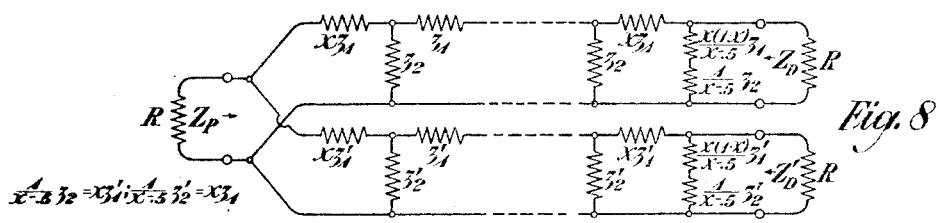
Fig. 8
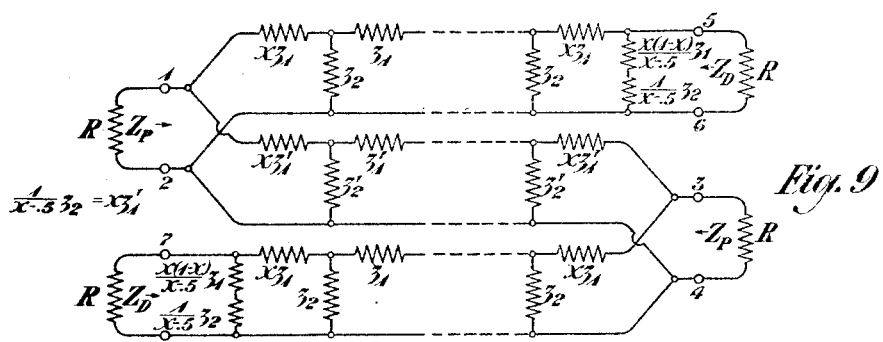
Fig. 9
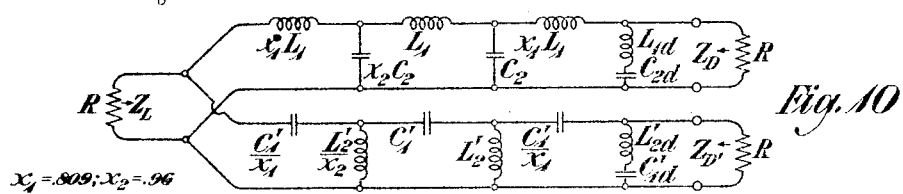
Fig. 10
$x_1 = .809; \; x_2 = .96$
INVENTOR.
O. J. Zobel
BY
ATTORNEY Patented Oct. 13, 1925.

1,557,230

UNITED STATES PATENT OFFICE.

OTTO J. ZOBEL, OF MAPLEWOOD, NEW JERSEY, ASSIGNOR TO AMERICAN TELEPHONE AND TELEGRAPH COMPANY, A CORPORATION OF NEW YORK.

COMPLEMENTARY FILTER.

Application filed April 30, 1920. Serial No. 377,965.

*To all whom it may concern:*

Be it known that I, OTTO J. ZOBEL, residing at Maplewood, in the county of Essex and State of New Jersey, have invented certain Improvements in Complementary Filters, of which the following is a specification.

This invention relates to selective circuits, and more particularly to selective circuits of the type known as wave filters.

In certain types of transmission circuits, where it has been desired to separate the different frequency currents transmitted over a line into two channels, it has been found convenient to produce the separation by means of wave filters of the general type disclosed in the U. S. patents to George A. Campbell, Nos. 1,227,113 and 1,227,114, issued May 22, 1917. For example, a so-called high pass filter might be used in one channel, and a so-called low pass filter might be used in the other channel, the high pass filter transmitting all currents above a certain frequency and the low pass filter transmitting all currents below a desired frequency. In such cases, the transmission and attenuation frequency regions for the wave filter used in one channel should be approximately the reverse of those for the wave filter in the other channel. In other words, the wave filters should be complementary.

In general, when a wave filter is connected in a circuit whose impedance is a practically constant resistance, large impedance irregularities are introduced between the wave filter and the circuit in the range of frequencies to be transmitted, since the characteristic impedance of the filter at any termination varies greatly with frequency. These impedance irregularities at the frequencies to be transmitted are objectionable not only from the standpoint of maximum energy transferred from the circuit to the wave filter, but also from the standpoint of repeater balance. I have found, however, that certain types of wave filters, if properly designed, will have characteristics such that over the range of free transmission, the product of the impedance of the series element of any section into the impedance of the shunt element of the section will be proportional to the square of a constant. The wave filter having this characteristic is known as a "constant $k$" filter. Among other filters, the so-called high pass and low pass filters of the Campbell type may be so designed as to be "constant $k$" filters.

In general, when two wave filters are connected in series or parallel, at the transmitting frequency of either wave filter, the total impedance of the two wave filters is not a constant resistance, which would be ideal, but varies greatly with frequency. It is possible, however, to obtain a practically constant resistance for the combined impedances of two such complementary wave filters at all frequencies except those in the neighborhood of the critical frequencies of the wave filters, provided the filters are complementary "constant $k$" types, where the series and shunt elements of the one type are proportional respectively to the shunt and series elements of the other type. One of the principal objects of the invention is to produce a circuit arrangement which will secure the result just stated, although other and further objects of the invention will more fully appear hereinafter.

In order to secure this result, advantage is taken of the fact that "constant $k$" wave filters may be terminated by a network so proportioned as to render the impedance of the filter approximately constant over the range of free transmission and equal to a constant resistance. I have also found that with complementary "constant $k$" types, where two wave filters are used together in the manner previously stated, they may be so terminated that either one approximately fulfills the rôle of the proper impedance corrective network for the other. Thus, from an impedance standpoint, there is a beneficial interference of one wave filter upon the other. This assumes that there are no large irregularities on the drop side of either wave filter at frequencies which it transmits, except those frequencies near the critical frequencies. The condition is easily fulfilled with "constant $k$" types of filters by using impedance corrective networks upon the drop sides of the filters.

It will be shown that when two complementary "constant $k$" wave filters are put in series, this result may be secured by terminating the filters in $x$-shunt, and when the filters are in parallel, the same result may be secured by terminating the filters in $x$-series, where $$x = .25 + .5\sqrt{.25 + \frac{4}{a}}$$

and "$a$" is an arbitrary constant usually taken as 4 or slightly greater. By an $x$-shunt termination of a filter is meant such a termination of the filter that the shunt element of the last section of the filter is an admittance, which is a fractional part of the full series admittance of a normal shunt element, said fraction being represented by $x$. In other words, if the impedance of the normal shunt element be represented by $z_2$, the terminal shunt impedance will be $\frac{z_2}{x}$. By an $x$-series termination is meant such a termination of the filter that the impedance of the series element of the last section will be a fractional part of the impedance of a full series element, $x$ representing the fraction as before. Thus, if the impedance of a normal series element be represented by $z_1$, the impedance of the terminal series element will be $x.z_1$.

Figure 2:
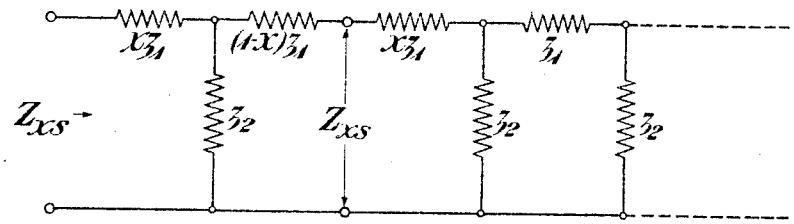

The wave filters forming the subject matter of this invention have a periodic structure consisting of a plurality of sections as shown in Fig. 2, each section comprising series and shunt impedance elements. These impedance elements are reactances, that is, they are made up of inductances and capacities in a manner more fully described hereafter. While the discussion of these wave filters is primarily on a basis that the elements are non-dissipative in character, the inevitable introduction of dissipation will not materially alter the designs obtained. In order to minimize the transmission losses in the wave filter there should be provided as large time constants for the inductances and capacities as is practicable in each specific case.

The computation for the filter on the assumed basis that its reactances are non-dissipative is justified both by theoretical investigations and by practical tests. It is well known that the resistance of a coil or condenser can be made very small compared to its inductive reactance or capacity reactance, and therefore the performance of such a coil or condenser may be computed approximately with entire neglect of such slight resistance.

Figure 3:
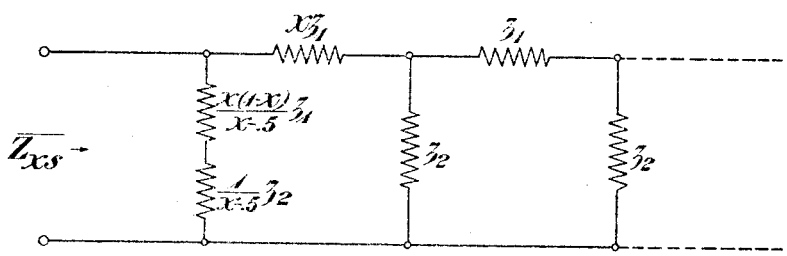
Figure 4:
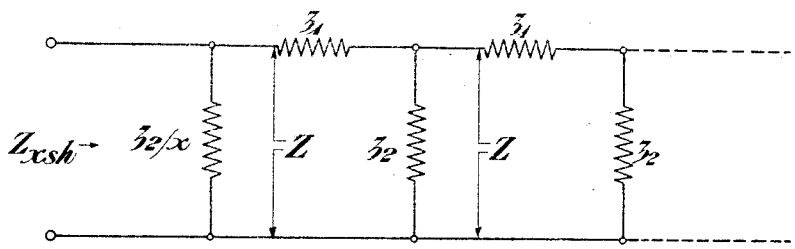
Figure 5:
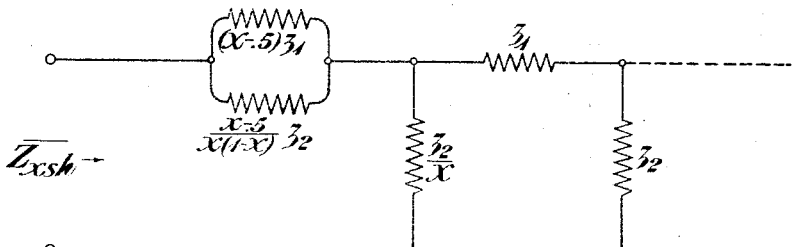

The invention may now be more fully understood by reference to the following detailed description, when read in connection with the accompanying drawings, in which Figure 1 is a series of curves exhibiting certain characteristics of "constant $k$" wave filters; Fig. 2 is a schematic diagram of a wave filter terminating in $x$-series; Fig. 3 is a schematic diagram showing a form of terminal network for making the impedance of the filter equal to a constant resistance; Fig. 4 is a schematic diagram of a wave filter terminating in $x$-shunt; Fig. 5 is a schematic diagram of a corresponding terminal network for securing the same results as in the case of Fig. 3; Fig. 6 is a simplified diagram showing how two complementary filters may be connected in series; Fig. 7 is a similar diagram showing how the filters may be connected in parallel; Fig. 8 is a diagram similar to Fig. 7 but showing the filters terminated on the drop side by networks to render their impedances from that side equivalent to a substantially constant resistance; Fig. 9 is a diagram similar to Fig. 8 and showing how complementary filters may be used for interconnecting two circuits to a certain range of frequencies; while frequencies outside the range transmitted over either circuit will be diverted into other channels; and Fig. 10 is a diagram of complementary high pass and low pass filters connected in parallel in accordance with the invention.

In order to secure the results sought by this present invention, two things are necessary: first, the determination of the desired complementary "constant $k$" type of filter corresponding to a known "constant $k$" type, and second, the impedance corrective design which gives the proper method of terminating these filters when combined in series or parallel so that the total impedance remains practically a constant resistance over most of the range of free transmission.

In order that these designs may be obtained, it is necessary to consider certain theory underlying the principles of wave transmission. In connection with this theory, a description will be given of two methods of terminating any "constant $k$" wave filter, so that the resulting corrected impedance is substantially a constant resistance $k$ throughout the transmitting range of the wave filter. For the best correction one method terminates the wave filter in .809-series, (that is, in a series element whose impedance is .809 times that of a full series element), and adds in shunt, a shunt annulling element consisting of $.5z_1$ in series with $3.236z_2$. The other method terminates the network in .809-shunt, (that is, in a shunt element whose admittance is .809 times that of a full shunt element), and adds in series, a series annulling element consisting of $.309z_1$ in shunt with $2z_2$. The theory underlying these impedance corrective designs is as follows:

It is well known that a smooth line having uniform series impedance distributions $z_1$ and uniform shunt impedance distributions $z_2$ per unit length, has the characteristic impedance $$k = \sqrt{z_1 \cdot z_2} \quad (1)$$

and a propagation constant $$\gamma = \sqrt{\frac{z_1}{z_2}} \quad (2)$$

A wave filter such as illustrated in Fig. 6, having series elements $z_1$ and shunt elements $z_2$ has a characteristic impedance at any termination which is a function of both the product and ratio of $z_1$ and $z_2$ and has propagation constant which is a function of their ratio. Hence it has been found convenient to express both the characteristic impedance and propagation constant of the wave filter in terms of $k$ and $\gamma$, the parameters of the corresponding smooth line. As pointed out in the Campbell patent above referred to, free transmission occurs in such wave filters, (if infinitely long) for a range of frequencies corresponding to the range $$\gamma^2 = 0 \text{ to } \gamma^2 = -4. \quad (3)$$

Let us now determine the $x$-series characteristic admittance, $A_{xs}$, of a wave filter, having a series element $z_1$ and a shunt element $z_2$ per section. Referring to the diagram of Fig. 2, the $x$-series impedance $Z_{xs}$ of such a filter may be expressed as follows:

$$Z_{xs} = xz_1 + \frac{z_2(Z_{xs} + (1-x)z_1)}{Z_{xs} + z_2 + (1-x)z_1} \quad (4)$$

This expression, by simple algebraic transformation may be expressed $$Z_{xs} = (x-.5)z_1 \pm \sqrt{z_1 z_2 + \frac{1}{4}z_1^2} \quad (5)$$

Now since the admittance is the reciprocal of the impedance, we have $$A_{xs} = \frac{1}{Z_{xs}} = \frac{1}{\pm\sqrt{z_1 z_2 + \frac{1}{4}z_1^2} + (x-.5)z_1} \quad (6)$$

Multiplying both numerator and denominator by $$\pm\sqrt{z_1 z_2 + \frac{1}{4}z_1^2} - (x-.5)z_1$$

we get $$A_{xs} = \frac{\pm\sqrt{z_1 z_2 + \frac{1}{4}z_1^2} + (.5-x)z_1}{z_1 z_2 + x(1-x)z_1^2} \quad (7)$$

Replacing $\frac{z_1}{z_2}$ by $\gamma^2$ and $z_1 \cdot z_2$ by $k^2$ we have $$A_{xs} = \frac{\pm\sqrt{1+\frac{1}{4}\gamma^2}}{1+x(1-x)\gamma^2} \cdot \frac{1}{k} + \frac{(.5-x)\gamma}{1+x(1-x)\gamma^2} \cdot \frac{1}{k} \quad (8)$$

In the transmitting range of the wave filter, where, as explained in the Campbell patent, $\gamma^2$ lies between 0 and $-4$, the admittance may be considered as being made up as two terms, the conductance, $C_{xs}$, and the susceptance, $S_{xs}$. This may be expressed as follows:

$$A_{xs} = C_{xs} + iS_{xs}. \quad (9)$$

Since, as explained in the Campbell patent, at transmitted frequencies $\gamma$ lies between 0 and $\pm i2$ and is imaginary, it follows that, from the formula of equation 8, the first half of the right hand portion of equation 8 represents the conductance (the conductance being positive), and the last half represents the susceptance (the susceptance being contained in the imaginary term). Hence we have $$C_{xs} = +\frac{\sqrt{1+\frac{1}{4}\gamma^2}}{1+x(1-x)\gamma^2} \cdot \frac{1}{k} \quad (10)$$

and $$iS_{xs} = \frac{(.5-x)\gamma}{1+(1-x)\gamma^2} \cdot \frac{1}{k} \quad (11)$$

Now it is apparent that the susceptance may be annulled in equation 8 by a shunt annulling element of equal value and opposite in sign to the value of the susceptance given in equation 11. The admittance $A_{sh}$ of the shunt element must then be $$A_{sh} = \frac{(x-.5)\gamma}{1+x(1-x)\gamma^2} \cdot \frac{1}{k} \quad (12)$$

Since the impedance $Z_{sh}$ of the annulling element is the reciprocal of the admittance, or $\frac{1}{A_{sh}}$, equation 12 may be rewritten by substituting the value of $\gamma$ and $k$ as follows:

$$Z_{sh} = \frac{z_2}{x-.5} + \frac{x(1-x)}{x-.5}z_1 \quad (13)$$

From the form of this equation it is apparent that the shunt annulling element consists of two parts in series—one part having an impedance $$\frac{z_2}{x-.5}$$

and the other part having an impedance $$\frac{x(1-x)}{x-.5}z_1.$$

This only holds true when $x$ is greater than .5, because if $x$ is less than .5, these quantities become negative and cannot be realized physically. The circuit arrangement of a filter terminating in $x$-series, and having a shunt annulling element conforming to equation 13 is illustrated schematically in Fig. 3. In the arrangement of Fig. 3, if $x$ is greater than .5, and the shunt annulling element is provided, there is left only the first part of the admittance of the filter, which, in the transmitting range, is the conductance $C_{xs}$. The conductance coefficient may be written as follows:

$$C_{xs} \cdot k = \frac{\sqrt{1 + \frac{1}{4}\gamma^2}}{1 + x(1-x)\gamma^2} \quad (14)$$

(See equation 10.) This coefficient, is plotted in Fig. 1, for different values of $x$, and as will be apparent this coefficient is substantially constant over the greater portion of the transmission range, when $x$ has a value of about .8. In the "constant $k$" type of filter the conductance will then be nearly equal to $\frac{1}{k}$ and the impedance to $k =$ constant in the transmitting range.

We will now determine the proper impedance corrective design for a filter having an $x$-shunt termination. Such a filter is indicated schematically in Fig. 4, and from this figure it is apparent that the $x$-shunt impedance $Z_{xsh}$ may be written as follows:

$$Z_{xsh} = \frac{\frac{z_2}{x} \cdot Z}{\frac{z_2}{x} + Z} = \frac{z_2 Z}{z_2 + xZ} \quad (15)$$

The impedance $Z$ of a filter having a full series termination may, from Fig. 4, be expressed as follows:

$$Z = z_1 + \frac{z_2 Z}{z_2 + Z} \quad (16)$$

Substituting this value of $Z$ in formula 15, we have, by simple algebraic transformations $$Z_{xsh} = \frac{z_2 \sqrt{z_1 z_2 + \left(\frac{z_1}{2}\right)^2} + \frac{z_1 z_2}{2}}{z_2 + x\sqrt{z_1 z_2 + \left(\frac{z_1}{2}\right)^2} + \frac{x z_1}{2}} \quad (17)$$

Multiplying both numerator and denominator by $$z_2 + \frac{x z_1}{2} - x\sqrt{z_1 z_2 + \left(\frac{z_1}{2}\right)^2}$$

and simplying, we have $$Z_{xsh} = \frac{z_2 \sqrt{z_1 z_2 + \frac{1}{4} \cdot z_1^2} + (.5 - x)z_1 z_2}{z_2 + x(1-x)z_1} \quad (18)$$

Substituting the values of $\gamma$ and $k$, this equation becomes $$Z_{xsh} = \frac{\sqrt{1 + \frac{\gamma^2}{4}}}{1 + x(1-x)\gamma^2} \cdot k + \frac{(.5 - x)\gamma}{1 + x(1-x)\gamma^2} \cdot k \quad (19)$$

From the form of this equation it is apparent that the second component is a reactance and the first component a resistance in the range of free transmission. The reactance component may obviously be annulled by a series element whose impedance is equal to the second component and opposite in sign. Thus $$Z_s = \frac{(x - .5)\gamma}{1 + x(1-x)\gamma^2} k \quad (20)$$

Substituting the values of $\gamma$ and $k$ in equation 20, we have, by simple algebraic transformation $$Z_s = \frac{(x - .5)z_1 \frac{(x - .5)}{x(1-x)} \cdot z_2}{(x - .5)z_1 + \frac{x - .5}{x(1-x)} \cdot z_2} \quad (21)$$

From equation 21 it is apparent that the annulling element may consist of two parallel elements, whose impedances are $(x - .5)z_1$ and $$\frac{(x - .5)}{x(1-x)} \cdot z_2$$

respectively when $x$ is greater than .5.

This arrangement is illustrated in Fig. 5, and when provided it is obvious that only the first part of the impedance of the filter remains, this part in the transmitting range being the resistance $R_{xsh}$. The resistance coefficient $\frac{R_{xsh}}{k}$ is the same coefficient as given in equation 14, and from Fig. 1 is nearly unity over the greater part of the transmitting range, when $x$ has a value about .8. Hence with a termination of .8 shunt, the resistance $R_{xsh}$ will, in the "constant $k$" types of filters, be substantially equal to $k$ in the transmitting range.

From equations 13 and 21 it is apparent that a "constant $k$" type of filter may be terminated by either a series or shunt annulling element, having such characteristics that the impedance of the filter over the transmitting range will be practically equal to a constant resistance. In practice, it is found that a desirable value for the factor $x$ in these equations is .809, which not only has the advantage of being near .8, which as shown in Fig. 1 is the most desirable value, but also permits of a similarity in the elements of both shunt and series annulling networks. This value of $x$ is chosen because then $$.5z_1 = \frac{x(1-x)}{x-.5} z_1.$$

$.5z_1$, it will be noted, is the value of the terminal series element in a mid-series termination of a wave filter which is, in practice, a very common form of termination for wave filters. The value of $x$ above given therefore, permits of using a half series element of the filter as one of the elements of the annulling network.

Leaving for the moment the design of terminating networks for filters, whereby they may be given constant impedance values, let us determine the design of desired complementary "constant $k$" wave filters independently of how they may be terminated. Let $z_1$ and $z_2$ be respectively the series and shunt impedance elements per section of a known "constant $k$" wave filter, having the required transmission and attenuation regions, where $$z_1 \cdot z_2 = k^2 = \text{constant} \quad (23)$$

The complementary "constant $k$" type of filter may now be obtained from $z_1$ and $z_2$ by putting its series element $z_1'$ proportional to $z_2$ and its shunt element $z_2'$ proportional to $z_1$. We will then have $$z_1' = az_2$$
and $\quad\quad\quad\quad\quad\quad\quad\quad\quad\quad (24)$
$$z_2' = \frac{z_1}{a}$$

where "$a$" is an arbitrary, positive constant whose significance will now be interpreted. By assigning this factor a value, the design of $z_1'$ and $z_2'$ will be fixed, since $z_1$ and $z_2$ are assumed known.

The known wave filter, in accordance with the principles of the Campbell patents, transmits freely when $$\gamma^2 = \frac{z_1}{z_2}$$

lies between 0 and $-4$, and its complementary type transmits when $$\gamma'^2 = \frac{z_1'}{z_2'}$$

lies between the same limits. From equation 24 it is apparent that $$\gamma'^2 = \frac{a^2}{\gamma^2} \quad (25)$$

Hence to the frequency range at which the known wave filter transmits, that is, to the range limiting $\gamma^2$ between 0 and $-4$, there corresponds in the complementary "constant $k$" wave filter a range $$\gamma'^2 = -\infty \text{ to } \gamma'^2 = \frac{-a^2}{4} \quad (26)$$

This range may or may not include part of the transmitting range of the known wave filter, depending upon the particular value chosen for "$a$." Thus, if "$a$" is less than 4, the transmitting ranges of the two wave filters will overlap, for then $\gamma'^2$ will be greater than $-4$; if "$a$" equals 4, the ranges just touch each other; and if "$a$" is greater than 4, the ranges are separated leaving a region in between where neither filter transmits, for in this case, $\gamma'^2$ will be less than $-4$. In practice, it is usually desirable to have the transmitting regions just touching or slightly separated. Hence, the value of "$a$" will usually be 4 or a slightly larger value.

Having now determined the design of two complementary wave filters, we will next elucidate the manner in which the complementary wave filters may be terminated in order that their total impedance, when connected in series or in parallel, will become practically a constant resistance, except near the critical frequencies. The methods of terminating the filters follow from a consideration of the method of impedance correction by means of corrective or annulling networks previously developed. The terminations for either a parallel or series connection are so chosen that one wave filter acts to a certain extent as a terminal annulling network for the other at the free transmitting frequencies of the latter.

Taking up first the case of two complementary wave filters connected in series as indicated in Fig. 6, it will be apparent from equation 21 et seq., that if the "constant $k$" filter, each of whose sections comprises series elements $z_1$ and shunt elements $z_2$, be terminated in $x$-shunt by means of a shunt element $\frac{z_2}{x}$, the imaginary part of its impedance may be neutralized by including in series with its terminal section a combination of two impedances in parallel. Now, in Fig. 6 it will be seen that the filter $z_1'$, $z_2'$ may be considered to form such a combination, if $$\frac{z_2'}{x},$$

which forms the $x$-shunt termination of the filter be considered one of the parallel impedances and the remainder of the filter be considered the other impedance in parallel therewith. We will then have, from equation 24, an impedance $$\frac{z_2'}{x} = \frac{z_1}{ax}$$

as one parallel impedance of an annulling network, while the other impedance will be an impedance somewhat greater than $z_1' = az_2$. This shunt combination will be somewhat similar to the shunt combination called for by equation 21 et seq. at the transmitting frequencies of the filter $z_1$, $z_2$, provided we put $$\frac{z_1}{ax} = (x-.5)z_1 \quad (27)$$

Solving this equation, we get $$x = .25 + .5\sqrt{.25 + \frac{4}{a}} \quad (28)$$

If $x$ be given the value called for by equation 28, then the $x$-shunt terminal element $$\frac{z_2'}{x}$$

of the lower filter of Fig. 6 will correspond exactly to one of the two parallel impedances required to make the impedance of the upper filter a constant resistance over its transmitting range. If "$a$" be made equal to 4, which as previously explained would be the value assigned to it where the transmission ranges of the two filters just touch each other, $x$ in equation 28 will have the value .809, which as already explained is the value which gives an approximately constant resistance equal to $k$ except near the critical frequencies. A larger value of the arbitrary constant "$a$" will, of course, give a smaller value of $x$. For this value of $x$ it will be noted that the impedance of that portion of the lower filter in Fig. 6, which is in parallel with the element $$\frac{z_2'}{x},$$

will be somewhat greater than is called for by equation 21 et seq. However, over the transmitting range of the upper filter, the element $$\frac{z_2'}{x},$$

plays a much larger part in determining the impedance of the parallel annulling combination than does the much larger impedance of the remainder of the lower filter. Consequently, while the desired result is only approximate so far as the second parallel element of the annulling combination is concerned, the approximation is sufficiently close that the lower filter will, to all intents and purposes, serve as an annulling element for the upper filter.

By a converse line of reasoning, it is clear that a similar approximation is reached when the complementary wave filter $z_1'$, $z_2'$ is considered as transmitting, the upper filter in this case serving as the annulling network. Equation 28 may be deduced for this converse relation and the two wave filters may therefore be made to mutually aid each other as regards impedance correction when terminated in accordance with equation 28.

In the case of two complementary filters in parallel, as shown in Fig. 7, the filters may be terminated so as to secure a similar annulling action upon each other. In this case, the filters should be terminated in $x$-series. From equation 13, it is apparent that the imaginary components of the impedances may be annulled by connecting two series impedances in shunt across the terminals of the last section of the filter, these series impedance elements having the values $$\frac{x(1-x)z_1}{x-.5} \text{ and } \frac{1}{x-.5}z_2 \quad (29)$$

It will be seen from Fig. 7 that the $x$-series element of the lower filter may function as one of the series impedances of the annulling combination, this element having from equation 24 the value $xz_1' = xaz_2$. The remainder of the lower filter constitutes a second impedance in series with the first impedance of the annulling combination, the second impedance having a value somewhat less than $$z_2' = \frac{z_1}{a}.$$

This series combination of impedances will correspond somewhat to the series combination called for by equation 13 at the transmitting frequencies of the upper filter, provided we put $$xz_1' = xaz_2 = \frac{z_2}{x-.5} \quad (30)$$

By solving equation 30, we will again obtain equation 28, so that $x$ should have the same value as in the parallel arrangement of Fig. 6. As before, if "$a$" be made equal to 4, $x$ will have the value .809. For this value, the element $xz_1'$ will exactly correspond to the requirements of the first element of equation 13. The remainder of the lower filter will not have the same impedance as called for by the second half of equation 13. Since, however, over the transmitting range of the upper filter of Fig. 7, the element $xz_1'$ plays the largest part in determining the impedance of the annulling combination, it is not so essential that the impedance of the remainder of the filter conform exactly to the requirements of equation 13.

As previously stated, for the best operation of two filters in parallel, or in series, the ends of the filters opposite to their junction points, or in other words, the drop sides of the filters should also be so terminated as to cause the impedance of each filter as viewed from the drop side to be substantially a constant resistance over the range of transmission of the filter. Accordingly, in Fig. 8, two filters are shown connected together in parallel so that each acts as an annulling element for the other, the two filters being connected to a circuit conventionally indicated as a resistance R at the left hand side of the figure. The dotted lines indicate that a large number of sections may intervene between the junction points of the filters and their drop sides. The filters upon their drop sides are terminated in $x$-series as indicated, and annulling elements constructed in accordance with equation 13 are provided to eliminate the reactance components of the impedance. The drop impedance $Z_d$ of the upper filter and the drop impedance $Z_d'$ of the lower filter may each be made, therefore, substantially equal at transmitted frequencies to the respective resistances R and R' of the circuits to which the filters are connected.

The complete impedance corrective arrangement for the interconnection of parallel complementary "constant $k$" wave filters is illustrated in Fig. 9. In accordance with the arrangement of this figure, a line made up of two sections, each having a resistance R may be connected to terminals 1, 2 and 5, 6 respectively, so that the upper wave filter of the figure interconnects the two sections of the line for transmission at certain frequencies. In a similar manner, another line made up of two sections each having a resistance R may be connected to terminals 3, 4 and 7, 8 so that the two sections of the line may be interconnected for transmission at certain frequencies by means of the lower filter of the series. A third filter is connected between terminals 1, 2 and 3, 4 so that one section of one line may transmit at other frequencies to another section of the other line. By this means, two lines which are independently transmitting currents of certain frequencies, may be connected at some given intermediate point, so as to transmit from one end of one line to one end of the other line currents of other frequencies, without causing interference between these different independent currents. The drop sides of the upper and lower filters are terminated by shunt annulling elements designed in accordance with equation 13, while the ends of the upper pair of filters connected to the terminals 1, 2 are so terminated and related to each other that the filters, being complementary, act as annulling elements for each other. The same is true of the lower pair of filters at the terminals 3, 4.

In all of the filter arrangements so far described, the shunt and series elements are conventionally indicated as impedances and it will be understood that in practice, these impedances may be made up of inductances and capacities in various relations. Thus, in Fig. 6, if the upper filter is a low pass filter, the elements $z_1$ will be inductances and the elements $z_2$ capacities. In this case, the lower filter will be the high pass filter so that the elements $z_1'$ will be capacities and the elements $z_2'$ inductances. Such an arrangement of high pass and low pass filters is indicated in Fig. 10, in which the normal series element of each section of the upper filter is an inductance $L_1$, and the shunt element is a capacity $C_2$. The normal series element of each section of the lower filter is a capacity $C_1'$ while the shunt element is an inductance $L'$. The filters are terminated in $x_1$-series where $x_1$ has a value of .809. The drop sides of the filter are terminated by shunt annulling elements comprising in the case of the upper filter an inductance $L_{2a}$ and a capacity $C_{2a}$, and in the case of the lower filter, an inductance $L_{2a}'$ and a capacity $C_{1a}'$. The values of these elements will be at once obtainable from equation 13. In this particular filter design, the nearest shunt element adjacent to the junction point of the two filters, instead of having the normal shunt value, is altered somewhat as indicated by the values $x_2 C_2$ in the case of the upper filter, and $$\frac{L_2'}{x_2}$$

in the case of the lower filter. In both instances, $x_2$ has a value of about .96. It has been found that by making this change in the last shunt element of each complementary filter, the filters will more nearly approach the requirements of the ideal annulling elements as given in equation 13. Each filter, therefore, will more closely approximate the ideal condition so far as its beneficial impedance effect upon the other filter is concerned.

It will be obvious that the general principles herein disclosed may be embodied in many other organizations widely different from those illustrated without departing from the spirit of the invention as defined in the following claims.

What is claimed is—

1. A selective circuit comprising a plurality of filters, each consisting of a plurality of like sections, and each section including shunt and series impedance elements, the filters being joined at one end of each so that certain frequencies may be diverted into one filter, and other frequencies into another filter, the filters at the junction point being terminated respectively in fractional sections so proportioned that for the free transmitting range of each filter the remaining filter or filters operate to reduce impedance irregularities of said each filter.

2. A selective circuit comprising a plurality of filters, each consisting of a plurality of like sections, and each section including shunt and series impedance elements, the filters being joined at one end so that certain frequencies may be diverted into one filter, and other frequencies into another filter, the filters at the junction point being terminated respectively in fractional sections so proportioned that over the greater proportion of the free transmitting range of each filter the remaining filter or filters operate conjointly therewith to have a substantially constant impedance.

3. A selective circuit comprising a plurality of filters, each consisting of a plurality of like sections, and each section including shunt and series impedance elements, the filters being joined at one end so that certain frequencies may be diverted into one filter and other frequencies into another filter, the filters at the junction point being terminated respectively in fractional sections so proportioned that over the major portion of the free transmitting range of each filter the remaining filter or filters operate to render the impedance of the combination substantially equal to a constant resistance.

4. A selective circuit comprising a plurality of filters, each consisting of a plurality of like sections and each section including shunt and series impedance elements, the filters being joined at one end so that certain frequencies may be diverted into one filter and other frequencies into another filter, the filters at the junction point being terminated respectively in fractional sections so proportioned that over substantially the entire range of free transmission of each filter, the remaining filter or filters operate as an annulling element to annul the reactance component of the impedance.

5. A selective circuit comprising two filters, each consisting of a plurality of like sections and each section including shunt and series impedance elements, said filters being joined at one end so that certain frequencies may be diverted into the one filter and other frequencies into the other filter, said filters at the junction point being each terminated in a fractional section so proportioned that each filter operates as an annulling element for the other to annul the reactance component of the impedance of the latter over substantially the entire range of free transmission.

6. In combination, a transmission line and two complementary filters connected therewith, each said filter having a fractional end section proportioned to make the corresponding filter operate as a reactance annulling network for the other filter.

7. In combination, a transmission line and a plurality of complementary filters connected therewith, each said filter having a fractional end section proportioned to make all the said filters except any one of them operate as a reactance annulling network for that one filter.

8. In combination, a transmission line, two filters connected therewith, the transmission band of one corresponding to the suppression band of the other and vice versa, each filter having an $x$-fractional termination toward the line, with $x$ equal to about 0.8 whereby each filter with such fractional termination acts as a reactance annulling network for the other filter.

9. In combination, a transmission line, a plurality of filters connected therewith, each filter having a respective transmission band for a frequency range lying within the suppression ranges for all the other filters, and all said filters except any one of them being proportioned and designed to serve as a reactance annulling network for such one filter.

10. In combination, a transmission line and a plurality of filters with respective exclusive transmission ranges, said assembly of filters having a resultant impedance substantially equal to the line impedance for frequencies within any one of the transmission ranges.

In testimony whereof, I, have signed my name to this specification this 28th day of April 1920.

OTTO J. ZOBEL.